United States Patent Office 3,292,177
Patented Dec. 13, 1966

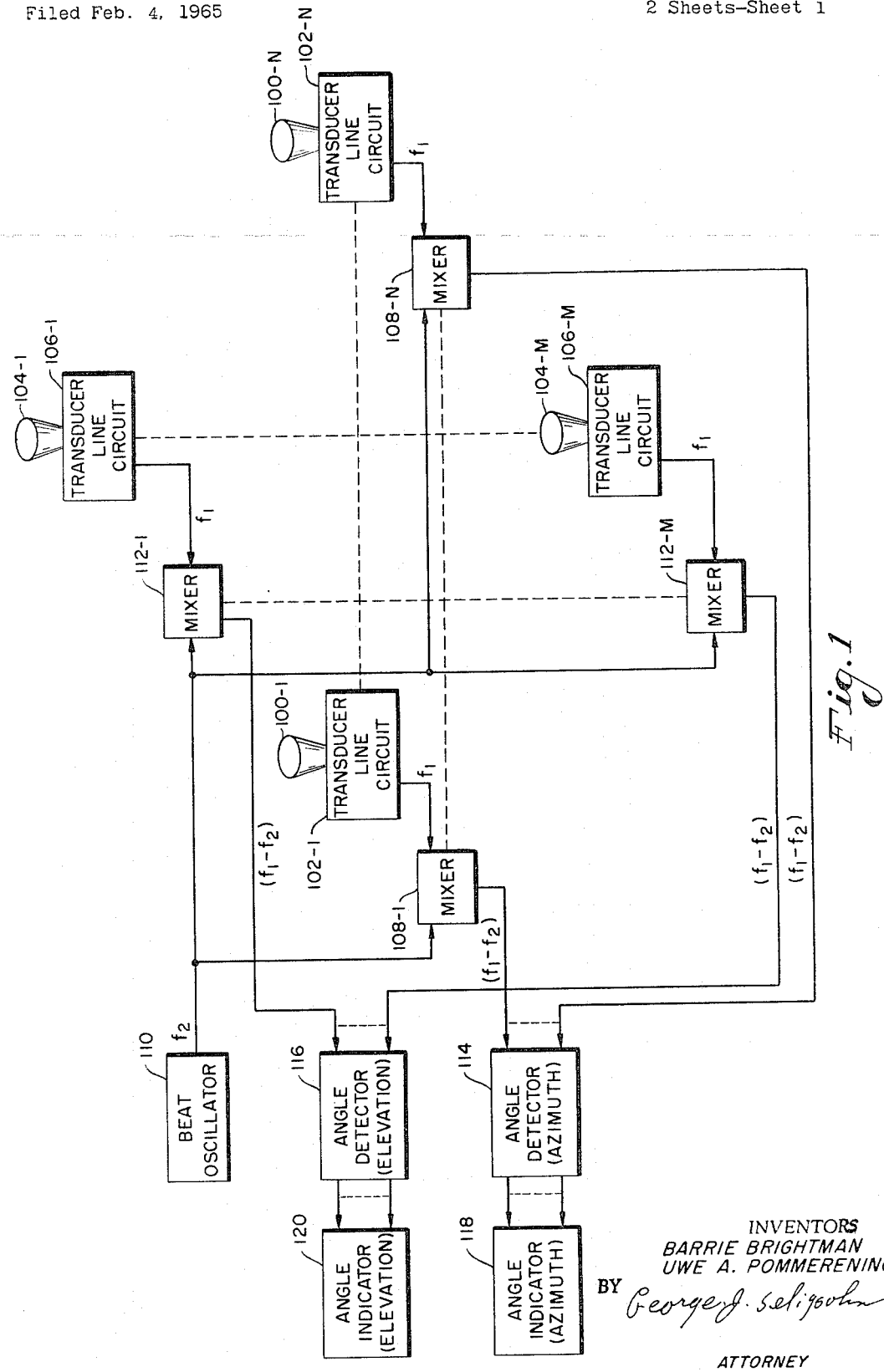

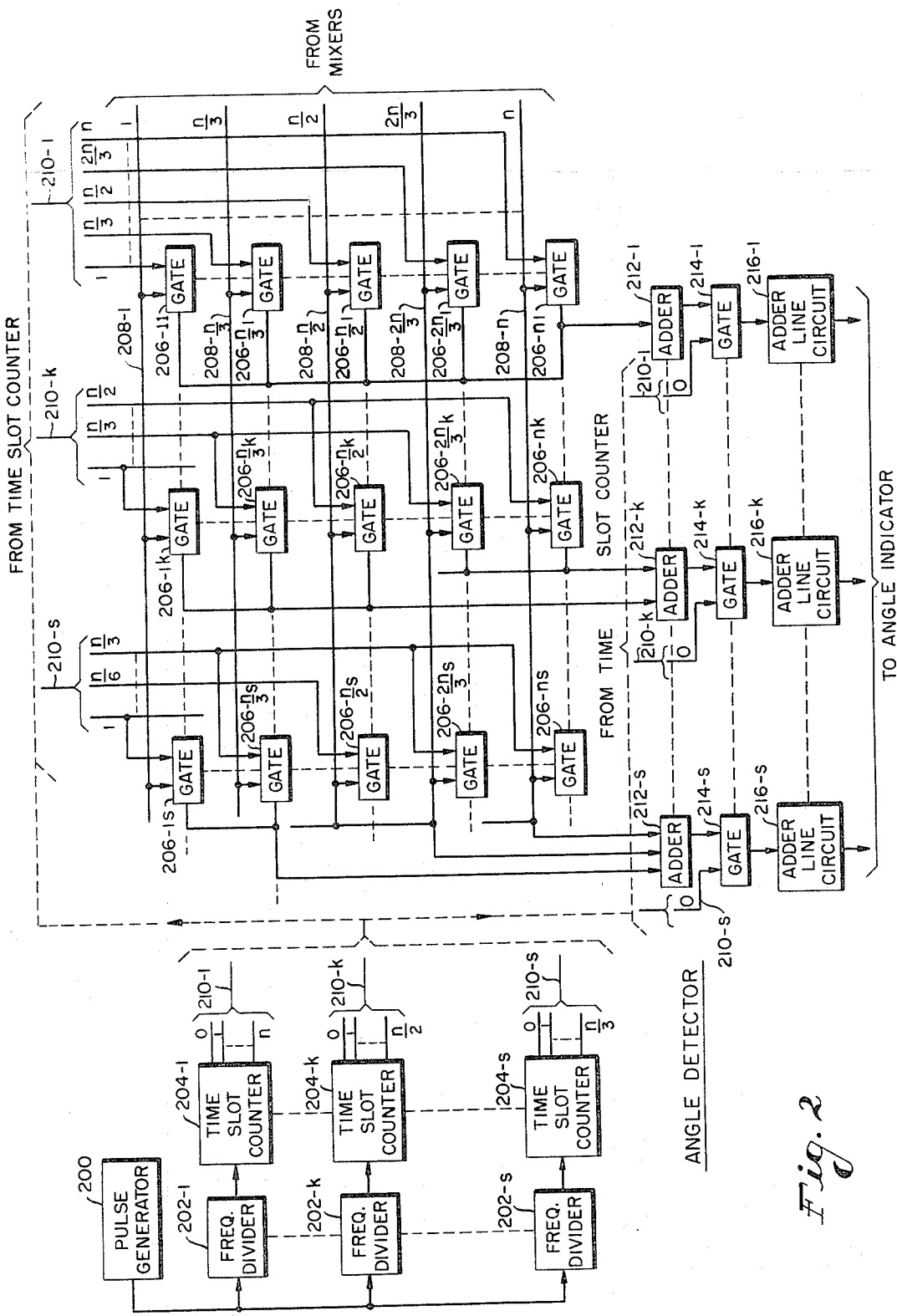

3,292,177
PHASE DETECTING SYSTEM FOR DETERMINING THE DIRECTION OF A BEAM IMPINGING UPON A FIXED RECEIVING ARRAY
Barrie Brightman and Uwe A. Pommerening, Webster, N.Y., assignors to Stromberg-Carlson, Rochester, N.Y., a corporation of Delaware
Filed Feb. 4, 1965, Ser. No. 430,263
7 Claims. (Cl. 343—113)

This invention relates to a phase detecting system and, more particularly, to such a system for determining the direction of a beam impinging upon a fixed receiving array.

It is well known that when a directional beam of energy impinges upon the transducing elements of a fixed array, such as an array composed of stationary sonar hydrophones, the direction of the beam is a function of the relative phase or time difference of the respective signals induced in the respective transducing elements making up the array.

For instance, if a broadside beam impinges upon a linear receiving array, in-phase signals will be derived from each of the transducing elements thereof. On the other hand, an end-fire beam substantially parallel to the linear array will result in a phase or time delay in the respective signals derived from adjacent transducing elements of the linear receiving array equal to the distance between adjacent transducing elements divided by the velocity of propagation of the transmitted energy in the medium surrounding the array. A beam which impinges upon the array at an angle between broadside and end-fire will result in the derivation of signals from adjacent transducers which have a relative phase or time delay greater than zero but less than that produced by an end-fire beam.

It will therefore be seen that it is possible to determine the directional angle of arrival of a beam of energy impinging upon a fixed receiving array by ascertaining the phase or time delay between the respective signals derived from each of the transducing elements of the array. The precision with which this determination is made, of course, depends upon the accuracy to which the relative phase or time delays can be ascertained. In order to obtain precise resolution, i.e., to a fraction of a degree, in the directional angle of arrival of a beam impinging upon a fixed receiving array, it is necessary that the array be made up of a very large number of individual transducing elements, such as 100 or more.

It will be appreciated that with ordinary space division techniques, it is inordinately difficult and expensive to compare the phase of each of the 100 or more signals derived from the transducing elements with the phase of the respective signals derived from each of the 100 or more transducing elements. This problem has limited the use of fixed receiving arrays for determining the directional angle of arrival of a variable direction beam.

The present invention contemplates the utilization of time division multiplex techniques, rather than space division techniques, capable of accurately (to a fraction of a degree) detecting the directional angle of arrival of a variable direction beam impinging upon a fixed receiving array composed of 100 or more individual transducing elements.

More particularly, in the present invention, signals derived from each transducing element of either a horizontal receiving array, for determining azimuth angle, or a vertical receiving array, for determining elevation angle, are sequentially sampled at a different rate by each one of a plurality of simultaneously operating separate time slot means and the samples obtained at each respective different rate are separately added up or integrated. That one of the adders which produces an integrated output having an amplitude which is greater than that produced by any of the other adders provides an indication of the exact angle of arrival of the directional beam impinging upon the horizontal array or vertical receiving array, as the case may be.

It is, therefore, an object of the present invention to provide an improved phase detecting system for determining the angle of arrival of a variable direction beam impinging upon a fixed receiving array.

It is a further object of the present invention to provide such a phase detecting system utilizing time division multiplex techniques.

These and other objects, features and advantages of the present invention will become more apparent from the following detailed description taken together with the accompanying drawings, in which:

FIG. 1 is a block diagram illustrating a preferred embodiment of the overall system; and FIG. 2 is a block diagram showing the details of an angle detector, such as utilized in the system shown in FIG. 1.

Referring now to FIG. 1, there is shown a linear horizontal receiving array composed of hydrophones 100–1 . . . 100–N, each of which has associated therewith an individual corresponding one of transducer line circuits 102–1 . . . 102–N. Also shown is a linear vertical receiving array composed of hydrophones 104–1 . . . 104–M, each of which has associated therewith an individual corresponding one of transducer line circuits 106–1 . . . 106–M. Each of the transducer line circuits includes a band-pass filter for passing only a certain band of frequencies If the present invention is incorporated in an active system, hydrophones 100–1 . . . 100–N and 104–1 . . . 104–M receive echoes of transmitted sonar exploratory pulses; while if the present invention is incorporated in a passive system, hydrophones 100–1 . . . 100–N and 104–1 . . . 104–M receive sounds originated from distant sources.

For reasons which will become apparent below, the output from each one of transducer line circuits 102–1 . . . 102–N is preferably mixed in a corresponding one of mixers 108–1 . . . 108–N with the output from beat oscillator 110 and the output from each one of transducer line circuits 106–1 . . . 106–M is preferably mixed in a corresponding one of mixers 112–1 . . . 112–M with the output from beat oscillator 110. The respective outputs from mixers 108–1 . . . 108–N are applied as individual inputs to angle detector 114, which detects the azimuth angle, and the respective outputs from mixers 112–1 . . . 112–N are applied as individual inputs to angle detector 116, which detects the elevation angle. As will become apparent below, mixers 108–1 . . . 108–N, beat oscillator 110 and mixers 112–1 . . . 112–M are not absolutely necessary and may be omitted. In this case, the respective outputs from transducer line circuits 102–1 . . . 102–N are applied directly as individual inputs to angle detector 114, and the respective outputs from transducer line circuits 106–1 . . . 106–M are applied directly as individual inputs to angle detector 116.

Angle detectors 114 and 116 are substantially identical in structure and function, and the details of a typical angle detector, as contemplated by the present invention, are shown in FIG. 2.

Referring now to FIG. 2, there is shown pulse generator 200, which generates periodic pulses at a predetermined very high frequency, such as 15 mc. for instance.

The output of pulse generator 200 is applied as an input to each of a plurality of individual frequency dividers, only three of which are shown, which include frequency dividers 202–1 . . . 202–k . . . 202–s . . . The output from each one of the frequency dividers is applied as an input to a time slot counter individually corresponding thereto. Thus, the output from frequency divider 202–1 is applied as an input to time slot counter 204–1; the output from frequency divider 202–k is applied as an input to time slot counter 204–k; and the output from frequency divider 202–s is applied as an input to time slot counter 204–s.

The purpose of pulse generator 200 and the group of frequency dividers is to produce at the outputs of the respective individual frequency dividers a respective series of pulses having pulse repetition rates which are subharmonically related to the pulse repetition rate of the series of pulses from frequency divider 202–1. Thus, the pulse repetition rate from frequency divider 202–2 (not shown) is one-half the pulse repetition rate of the output from frequency divider 202–1; the pulse repetition rate from frequency divider 202–3 (not shown) is one-third the pulse repetition rate of the output from frequency divider 202–1; the pulse repetition rate from frequency divider 202–4 (not shown) is one-quarter the pulse repetition rate of the output from frequency divider 202–1, et cetera. The absolute pulse repetition rate from frequency divider 202–1 may be any desired fraction of the pulse repetition rate of the pulses from pulse generator 200, or frequency divider 202–1 may be omitted entirely, in which case the pulses from pulse generator 200 are applied directly as an input to time slot counter 204–1. In this latter case, the pulse repetition rate of the output from frequency divider 202–2 (not shown) would be one-half the pulse repetition rate from pulse generator 200 itself, the pulse repetition rate of the output from frequency divider 202–3 (not shown) would be one-third the pulse repetition rate from pulse generator 200 itself, the pulse repetition rate of the output from frequency divider 202–4 (not shown) would be one-quarter the pulse repetition rate from pulse generator 200 itself, et cetera.

The group of time slot counters associated with the group of frequency dividers is made up of a plurality of subgroups. Each of the first subgroup of time slot counters, which consists of time slot counters 204–1 . . . 204–(k–1) (not shown), has $n+1$ individual outputs, numbered respectively in serial order from 0 to $n$, where $n$ represents the number of individual inputs to the angle detector. Thus, in the case of angle detector 114, shown in FIG. 1, $n$ is equal to N, and in the case of angle detector 116, shown in FIG. 1, $n$ is equal to M.

Each of the second subgroup of the time slot counters, which consists of time slot counters 204–k . . . 204–(s–1) (not shown), has $$\frac{n}{2}+1$$

individual outputs, numbered respectively in serial order from 0 to $n/2$. Of course, since the number of output conductors must be a whole number, if $n$ is an odd number the actual number of output conductors from each of the time slot counters of the second subgroup would be $$1\frac{1}{2}+\frac{n}{2}$$

rather than $$1+\frac{n}{2}$$

i.e., if $n$ were either 101 or 102, for instance, in both cases, each of the time slot counters of the second subgroup would have 52 output conductors.

In a similar manner, each time slot counter of the third subgroup, beginning with time slot counter 204–s, has $$1+\frac{n}{3}$$

output conductors numbered respectively in serial order from 0 to $n/4$. If a fourth subgroup is necessary, for reasons which will become apparent below, each time slot counter thereof will have $$1+\frac{n}{4}$$

output conductors, an so on.

Each time slot counter is a cyclical counter or commutator, which applies each successive input pulse from the frequency divider corresponding thereto in sequence to each output conductor thereof.

Further shown in FIG. 2 is an individual column composed of $n$ normally closed gates corresponding with each time slot counter. More particularly, the column of gates 206–11 . . . 206–n1 correspond with time slot counter 204–1; the column of gates 206–1k . . . 206–nk correspond with time slot counter 204–k; and the column of gates 206–1s . . . 206–ns correspond with time slot counter 204–s. Further, as shown, each of the input conductors to the angle detector from the $n$ individual mixer feeding the angle detector is associated with an individual row of gates, i.e., conductor 208–1 from the first mixer feeding the angle detector, such as mixer 108–1 feeding angle detector 114 or mixer 112–1 feeding angle detector 116 in FIG. 1, applies the output signal thereof as a first input to each of the gates, such as gates 206–11, 206–1k and 206–1s, of the top row . . . and conductor 208–n from the $n$th mixer feeding the angle detector, such as mixer 108–N feeding angle detector 114 or mixer 112–M feeding angle detector 116 in FIG. 1, applies the output signal thereof as a first input to each of the gates, such as gates 206–n1, 206–nk and 206–ns, of the bottom row.

Output conductors 1 to $n$ of time slot counter 204–1 of the first subgroup are forwarded, as shown, over connection 210–1, where each of them is respectively connected, as shown, as a second input to the appropriate one of the column of gates 206–11 . . . 206–n1 which correspond with time slot counter 204–1. The outputs of all of the column of gates 206–11 . . . 206–n1 are connected in common, as shown, and applied as a single input to adder 212–1.

The output conductors 1 to $n$ of each of the time slot counters 204–2 (not shown) . . . 204–(k–1) (not shown) of the first subgroup are respectively connected as second inputs to each one of the column of gates which corresponds with that time slot counter in the same identical manner as the output conductors 1 to $n$ of time slot counter 204–1 are respectively connected as second inputs to the column of gates 206–11 . . . 206–n1. Also, the outputs of each of these column of gates of the first subgroup are connected in common and applied as a single input to an adder corresponding to that column in the same identical manner as the outputs of the column of gates 206–11 . . . 206–n1 are connected in common and applied as a single input to adder 212–1.

Output conductors 1 to $n/2$ of time slot counter 204–k of the second subgroup are forwarded, as shown, over connection 210–k, where conductor 1 thereof is connected as a second input to both gate 206–1k and gate $$206-\left(\frac{n}{2}+1\right)k$$

(not shown); conductor 2 (not shown) thereof is connected as a second input to both gate 206–2k (not shown) and gate $$206-\left(\frac{n}{2}+2\right)k$$

(not shown) . . . and conductor n/2 thereof is connected as a second input to both gate $$206-\frac{n}{2}k$$

and gate 206–nk. It will thus be seen that the column of gates 206–1k . . . 206–nk is divided into two halves and each of the conductors 1 to $n/2$ from time slot counter 204–$k$ is connected as a second input to corresponding gates of both halves of this column. The outputs of the top half of this column of gates, namely, gates $$206\text{–}1k \ldots 206\text{–}\tfrac{n}{2}k$$

are connected in common and applied as a first input to adder 212–$k$; while the outputs of the bottom half of this column of gates, namely, gates $$206\text{–}\left(\tfrac{n}{2}+1\right)k$$

(not shown) ... 206–$nk$, are connected in common and applied as a second input to adder 212–$k$.

Each of the other column of gates of the second subgroup (not shown) has the conductors 1 to $n/2$ thereof connected as a second input thereto, and has the outputs thereof connected as first and second inputs to an adder corresponding thereto, in a manner identical to that shown for the column of gates 206–1$k$ ... 206–$nk$ of the second subgroup.

Output conductors 1 to $n/3$ of time slot counter 204–$s$ of the third subgroup are forwarded, as shown, over connection 210–$s$, where conductor 1 thereof is connected as a second input to gates 206–1$s$, $$206\text{–}\left(\tfrac{n}{3}+1\right)s$$

(not shown), and $$206\text{–}\left(\tfrac{2n}{3}+1\right)s$$

(not shown); conductor 2 (not shown) thereof is connected as a second input to gates 206–2$s$ (not shown), $$206\text{–}\left(\tfrac{n}{3}+2\right)s$$

(not shown), and $$206\text{–}\left(\tfrac{2n}{3}+2\right)s$$

(not shown) ... and conductor $n/3$ thereof is connected as a second input to gates $$206\text{–}\tfrac{n}{3}s,\ 206\text{–}\tfrac{2n}{3}s$$

and 206–$ns$. It will be seen that the column of gates 206–1$s$ ... 206–$ns$ is divided into three thirds and each of the conductors 1 to $n/3$ from time slot counter 204–$s$ is connected as a second input to corresponding gates of each of the three separate thirds of this column. The outputs of the top third of this column of gates, namely, gates $$206\text{–}1s \ldots 206\text{–}\tfrac{n}{3}s$$

are connected in common and applied as a first input to adder 212–$s$; while the outputs of the middle third of this column of gates, namely, gates $$206\text{–}\left(\tfrac{n}{3}+1\right)s\text{(not shown)} \ldots 206\text{–}\tfrac{2n}{3}s$$

are connected in common and applied as a second input to adder 212–$s$; and the outputs of the bottom third of this column of gates, namely, gates $$206\text{–}\left(\tfrac{2n}{3}+1\right)s\text{(not shown)} \ldots 206\text{–}ns$$

are connected in common and applied as a third input to adder 212–$s$.

Each of the other column of gates of the third subgroup (not shown) has the conductors 1 to $n/3$ thereof connected as a second input thereto, and has the outputs thereof connected as first, second and third inputs to an adder corresponding thereto, in a manner identical to that shown for the column of gates 206–1$s$ ... 206–$ns$ of the third subgroup.

It will be seen that if more than three subgroups are included, each of the column of gates of a fourth subgroup would be divided into four portions and each of output conductors 1 to $n/4$ of that time slot counter corresponding thereto would be connected as a second input to corresponding gates of each of the four portions, while the outputs from the gates of each of the four portions would be connected in common and applied as a separate input to an adder corresponding with each of the columns of this fourth subgroup. This pattern can be extended for as many subgroups as there are included in any particular system.

Each of the adders corresponding to a column of gates in the first subgroup, such as adder 212–1, consists of an integrator which may be composed of a single integrating amplifier, for instance, for producing a single integrated output which comprises a signal proportional to the sum of the individual samples applied to its single input. Each of the adders corresponding to a column of gates in the second subgroup, such as adder 212–$k$, consists of an integrator which may be composed of an individual integrating amplifier for each of its two inputs, for instance, and means for summing the respective outputs of these two individual integrating amplifiers to provide a single adder output which comprises a signal proportional to the sum of the individual samples applied to both of its two inputs. In a similar manner, each of the adders corresponding to a column of gates in the third subgroup, such as added 212–$s$, consists of an integrator which may be composed of an individual integrating amplifier for each of its three inputs, for instance, and means for summing the respective outputs of these three individual integrating amplifiers to provide a single adder output which comprises a signal proportional to the sum of the individual samples applied to its three inputs; and adders for subgroups beyond the third subgroup, if present, follow the same pattern as just described for adders of the second and third subgroups, respectively.

As shown, the single output of the adder corresponding to each column of normally closed output gates, such as adders 212–1, 212–$k$ and 212–$s$, is applied as a first input to an individual output gate corresponding thereto, such as output gates 214–1, 214–$k$ and 214–$s$. Further, as shown, the 0 conductor from each respective time slot counter is applied as a second input solely to that one of the output gates which corresponds thereto. Thus, for instance, the 0 conductor from time slot counter 204–1 is applied over connection 210–1 as a second input to output gate 214–1, the 0 conductor from time slot counter 204–$k$ is applied over connection 210–$k$ as a second input to output gate 214–$k$, and the 0 conductor from time slot counter 204–$s$ is applied over connection 210–$s$ as a second input to output gate 214–$s$.

As shown, the output of each output gate is applied as an input to an adder line circuit corresponding thereto, such as adder line circuits 216–1, 216–$k$ and 216–$s$, for instance. Each adder line circuit includes a low-pass filter for integrating the sampling frequency of the pulses applied to the input thereof to produce an individual signal at the output thereof which has a relative amplitude which is a function of the relative phase or time delay between the respective output signals from the $n$ mixers applied as an input to the angle detector. More specifically, the particular adder line circuit which produces that output signal having the maximum amplitude with respect to the output signals produced by all the adder line circuits indicates the value of the relative phase or time delay which actually exists.

The output signals from each of the adder line circuits, such as adder line circuits 216–1, 216–$k$ and 216–$s$, are applied as inputs to an angle indicator, such as angle indicator 118 coupled to the output of angle detector 114 or angle indicator 120 coupled to the output of angle detector 116, in FIG. 1. The angle indicator may be either a simple device which merely indicates the amplitude of each adder line circuit output signal, so that the maximum amplitude may be noted by an observer, or may be a more sophisticated device which produces a discrete output indicative of just which one of the adder line circuit output signals has the maximum amplitude.

Considering now the operation of the present invention, each of transducer line circuits 102-1 . . . 102-N, in response to an impinging energy beam, produces an output signal centered about frequency $f_1$, which is passed by the band-pass filter of each of these transducer line circuits. The frequency $f_1$ may be in the order of a few thousand cycles per second, for instance. The relative phase of the signals emanating from each of transducer line circuits 102-1 . . . 102-N depends upon the azimuth angle of the impinging energy beam and the distance between adjacent transducers.

In a similar manner, the respective transducer line circuits 106-1 . . . 106-M produce a signal centered about frequency $f_1$ which have a relative phase which depends upon the elevation angle of the impinging energy beam and the distance between adjacent ones of these transducers.

Beat oscillator 110 has a frequency $f_2$ such that the difference frequency $(f_1-f_2)$ produced by mixers 108-1 . . . 108-N and 112-1 . . . 112-M, respectively, is substantially lower than frequency $f_1$, such as a few hundred cycles per second. As stated above, beat oscillator 110 and mixers 108-1 . . . 108-N and mixers 112-1 . . . 112-M are not absolutely essential for the operation of the invention. However, as will become apparent below, reducing the frequency of the signals applied to each angle indicator makes it possible to utilize fewer different subgroups of columns of gates, or, putting it another way, makes it possible to increase the number of columns of gates included in the first subgroup with respect to the number included in higher subgroups, increase the number of columns of gates in the second subgroup with respect to the number included in still higher subgroups, and so on. Since the adders utilized in the first subgroup are simpler than the adders utilized in the higher subgroups, and the adders utilized in the second subgroup are simpler than the adders utilized in the still higher subgroups, the reduction in the number of subgroups results in a saving in equipment.

Considering now the operation of the angle detector, it will be seen that each column of gates is effective in sequentially sampling the respective signals applied thereto at a different rate. Furthermore, these different rates are all integral subharmonics of the highest rate, i.e., the pulse repetition rate emanating from frequency divider 202-1, which is applied through time slot counter 204-1 to the column of gates 206-11 . . . 206-$n$1. Obviously, therefore, the frame period necessary to sequentially sample each of the $n$ signals once takes longer and longer as the sampling rate gets lower and lower. However, Nyquist's theorem states that in order not to lose information in a sampled signal, successive samples of that signal must occur at a rate which is more than twice the frequency of that signal. Therefore, it will be seen that when the sequential sampling of the $n$ different signals takes place at a rate which is low enough, the time between the successive sampling of each signal will finally reach a point where it no longer satisfies Nyquist's theorem. In order to overcome this, the $n$ signals to be sampled may be divided into two groups, wherein corresponding members thereof are sampled simultaneously. Since only half the total number of signals are in each of the two groups, it is possible to sequentially sample the signals in each of the two groups at this low rate and yet satisfy Nyquist's theorem. As the sequential sampling frequency gets still lower, it may be necessary to divide the signals into a third group, or, perhaps, ultimately even more than three groups. This is the reason why the columns of gates in FIG. 2 are shown as divided into first, second and third subgroups, as described above.

It will now be seen why it is desirable that mixers be employed to provide low frequency signals as an input to the angle detector. The reason is that the minimum frame rate, and hence the minimum sequential sampling rate for accommodating $n$ samples, which fulfills Nyquist's theorem becomes smaller as the signal frequency to be sampled becomes lower. Therefore, more columns of gates may be included in the first subgroup before it becomes necessary, in order to fulfill Nyquist's theorem, to provide a second subgroup of columns of gates, et cetera.

As previously stated, there will be a particular phase delay between adjacent signals to be sampled, which phase delay depends upon the direction of the energy beam impinging on the array. Furthermore, as far as each column of gates is concerned, there will be a phase delay between the opening of successive gates thereof, which, in any given case, is determined by the pulse repetition rate of the output from the frequency divider corresponding to that column of gates. In general, the phase delay between the opening of the gates of a column of gates will be different from the phase delay between adjacent signals to be sampled. Therefore, in general, phase slippage will take place and when the samples emanating from the various ones of a column of gates are algebraically summed together, the sum will tend to average out at zero amplitude. However, in that special case where the phase delay between the opening of successive gates of a column of gates is substantially equal to the phase delay which exists between adjacent signals to be sampled, there will be negligible phase slippage and the adder corresponding to this particular column of gates will produce an output having an amplitude which is greater than the respective amplitudes of the outputs produced by any of the other columns of gates, which is an indication of the value of the phase delay which actually exists between adjacent signals to be sampled, and hence an indication of the direction of the beam impinging upon the array. This indication is provided by the angle indicator which follows the angle detector.

Although only a preferred embodiment of the invention has been described in detail herein, it is not intended that the invention be restricted thereto, but that it be limited only by the true spirit and scope of the appended claims.

What is claimed is:

1. In combination, a fixed linear array including a predetermined number of transducers for receiving a directional energy beam impinging thereon, whereby respective signals which are relatively phase-displaced in accordance with the direction of said beam will be induced in adjacent transducers of said array, phase-sensitive means including a plurality of individual sampling means coupled to said transducers each of which sampling means in effect sequentially samples the respective signals from adjacent transducers of said array at a different predetermined rate, an individual adder means coupled to each sampling means and responsive to the amplitude of each of the sequential samples produced by that sampling means to which it is coupled for producing an output signal therefrom having an amplitude proportional to the sum of the amplitudes of these sequential samples, and indicator means coupled to said adder means for indicating which individual adder means produces the output signal having the greatest amplitude.

2. The combination defined in claim 1, wherein each sampling means includes an individual normally closed gate corresponding to each of said transducers, pulse producing means for producing pulses at a repetition rate equal to that predetermined rate which is individual to that sampling means, a cyclical time slot counter coupled to said pulse producing means and having a given number between three and said predetermined number plus one of separate outputs for distributing in order successive ones of the pulses from said pulse producing means to different ones of said separate outputs thereof during each cycle thereof, and coupling means for coupling each separate output except one of said time slot counter to at least one of said gates in a manner such that each and every gate is coupled to only a single output of said time slot counter and successive pulses from said pulse generating means are applied sequentially to each gate of at least one set of said gates which correspond respectively to adjacent ones of said transducers for momentarily opening any gate in response to the application of a pulse thereto, wherein said phase-sensitive means further includes signal translating means for applying a signal which is a single-valued function of the signal induced in each transducer as an input to the gate of each sampling means which corresponds with that transducer, and wherein each adder means includes integrating means for summing the outputs of the gates of the sampling means with which it corresponds during each cycle of the time slot counter of that sampling means and a normally closed output gate coupled to said integrating means and to said excepted one of the outputs of the time slot counter of the sampling means to which that adder means is coupled for momentarily opening said output gate in response to the presence of a pulse on said excepted one of the outputs to pass the output of said integrating means.

3. The combination defined in claim 2, wherein the cyclic frequency of the time slot counter of each sampling means is more than twice as high as the highest significant frequency component of the respective signals applied to the gates of that sampling means, and wherein each adder means further includes a low-pass filter having a cut-off frequency intermediate said highest significant frequency and said cyclic frequency of that sampling means with which that adder means corresponds, and means for applying the output of the output gate of each adder means as an input to said low-pass filter thereof.

4. The combination defined in claim 2, wherein the pulses produced by one of said pulse producing means have a first predetermined repetition rate, and the pulses produced by each other pulse producing means have a predetermined repetition rate which is a different subharmonic of said first predetermined repetition rate.

5. The combination defined in claim 2, wherein said signal translating means includes an individual mixing means corresponding to each of said transducers for beating said signal induced in the transducer corresponding thereto with a fixed frequency signal to produce as an output therefrom a difference signal having frequency components equal to the difference between said fixed frequency signal and the frequency components of said signal induced in the transducer corresponding thereto, said difference signal from each mixing means being applied as said input to that gate of each sampling means which corresponds with the same transducer as that mixing means.

6. The combination defined in claim 2, wherein all the gates of at least a certain one of said sampling means comprise a single one of said sets of gates, and wherein the outputs of all of said gates of said certain one of said sampling means are connected in common as a single input to said integrating means of that adder means which is coupled to said certain one of said sampling means.

7. The combination defined in claim 2, wherein at least a particular one of said sampling means consists of a plurality of said sets of gates, wherein said integrating means of said adder means coupled to said particular one of said sampling means includes an individual integrator corresponding to each of said plurality of sets of gates and means for summing the respective outputs of said integrators thereof, and wherein the outputs of all the gates composing each respective one of said plurality of sets of gates are connected in common as a single input solely to that individual integrator which corresponds with that set.

No references cited.

CHESTER L. JUSTUS, *Primary Examiner.*

D. C. KAUFMAN, *Assistant Examiner.*